United States Patent
Noh et al.

(10) Patent No.: US 10,349,298 B2
(45) Date of Patent: Jul. 9, 2019

(54) METHOD FOR ORDERING MEASURING OF INTER-DEVICE INTERFERENCE IN WIRELESS COMMUNICATION SYSTEM, AND DEVICE FOR SAME

(71) Applicant: LG ELECTRONICS INC., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/518,801

(22) PCT Filed: Nov. 9, 2015

(86) PCT No.: PCT/KR2015/011982
§ 371 (c)(1),
(2) Date: Apr. 13, 2017

(87) PCT Pub. No.: WO2016/072813
PCT Pub. Date: May 12, 2016

(65) Prior Publication Data
US 2017/0245167 A1   Aug. 24, 2017

Related U.S. Application Data

(60) Provisional application No. 62/077,298, filed on Nov. 9, 2014.

(51) Int. Cl.
*H04W 24/10* (2009.01)
*H04J 11/00* (2006.01)
(Continued)

(52) U.S. Cl.
CPC ............. *H04W 24/10* (2013.01); *H04J 11/00* (2013.01); *H04L 5/0048* (2013.01);
(Continued)

(58) Field of Classification Search
CPC ...... H04W 24/10; H04W 88/08; H04W 74/04; H04W 28/12; H04W 28/0231;
(Continued)

(56) References Cited

U.S. PATENT DOCUMENTS 9,197,683 B2 * 11/2015 Fwu .................. H04W 4/70
2008/0002598 A1 * 1/2008 Beser ................. H04W 4/02
                                                                370/281
(Continued)

FOREIGN PATENT DOCUMENTS

| KR | WO2014098407 | * | 6/2014 | ............. H04B 7/04 |
| WO | WO 2014/092365 A1 | | 6/2014 | |
| WO | WO 2014/098407 A1 | | 6/2014 | |

*Primary Examiner* — Warner Wong
(74) *Attorney, Agent, or Firm* — Birch, Stewart, Kolasch & Birch, LLP

(57) ABSTRACT

The present invention relates to a method and device for ordering the measuring of Inter-Device Interference (IDI) for a base station in a wireless communication system. In particular, the method is characterized by comprising the steps of: transmitting downlink allocation information on a certain wireless resource to a first terminal; ordering the measuring of IDI to the first terminal when the certain wireless resource is allocated for uplink communication by at least one second terminal; ordering the transmitting of a reference signal defined for measuring IDI for the at least one second terminal; and transmitting reference signal measurement information, allocated to the at least one second terminal, to the first terminal.

6 Claims, 14 Drawing Sheets

(51) Int. Cl.
*H04L 5/00* (2006.01)
*H04W 72/04* (2009.01)
*H04L 12/911* (2013.01)
*H04W 88/08* (2009.01)

(52) U.S. Cl.
CPC ....... *H04L 5/0053* (2013.01); *H04W 72/0406* (2013.01); *H04W 72/0446* (2013.01); *H04L 5/0007* (2013.01); *H04L 47/822* (2013.01); *H04W 72/042* (2013.01); *H04W 88/08* (2013.01)

(58) Field of Classification Search
CPC . H04W 28/0236; H04W 36/20; H04W 52/44; H04L 5/0048; H04L 5/0037; H04L 2025/03783; H04L 27/261; H04L 5/0062; H04L 47/822
See application file for complete search history.

(56) References Cited

U.S. PATENT DOCUMENTS

| | | | |
|---|---|---|---|
| 2010/0309876 A1* | 12/2010 | Khandekar | H04L 5/0037 370/330 |
| 2011/0038264 A1* | 2/2011 | Ishii | H04L 47/10 370/238 |
| 2011/0188428 A1* | 8/2011 | Ishii | H04W 72/04 370/311 |
| 2012/0099540 A1 | 4/2012 | Doppler et al. | |
| 2013/0170387 A1 | 7/2013 | Wang et al. | |
| 2013/0250925 A1* | 9/2013 | Lohr | H04W 72/0446 370/336 |
| 2013/0303214 A1* | 11/2013 | Ahmadi | H04W 72/1215 455/501 |
| 2014/0256369 A1* | 9/2014 | Ji | H04W 8/005 455/500 |
| 2014/0274088 A1 | 9/2014 | Talwar et al. | |
| 2015/0043392 A1* | 2/2015 | Susitaival | H04L 5/1469 370/280 |
| 2015/0078220 A1* | 3/2015 | Hu | H04W 24/08 370/280 |
| 2015/0103704 A1* | 4/2015 | Skov | H04W 72/0446 370/280 |
| 2015/0351117 A1* | 12/2015 | Rahman | H04W 72/1231 370/252 |
| 2015/0382375 A1* | 12/2015 | Bhushan | H04L 5/0005 370/252 |
| 2016/0037385 A1* | 2/2016 | Boudreau | H04W 76/14 370/328 |
| 2016/0242188 A1* | 8/2016 | Tiirola | H04W 24/10 |
| 2017/0048741 A1* | 2/2017 | Lee | H04W 76/10 |
| 2018/0124628 A1* | 5/2018 | Kim | H04L 1/0026 |

* cited by examiner

FIG. 2
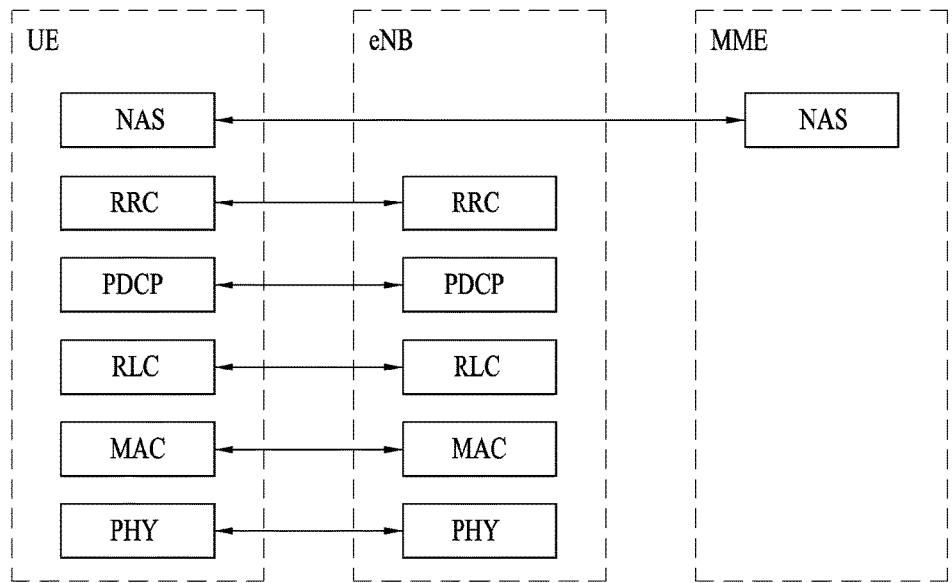
(a) control-plane protocol stack
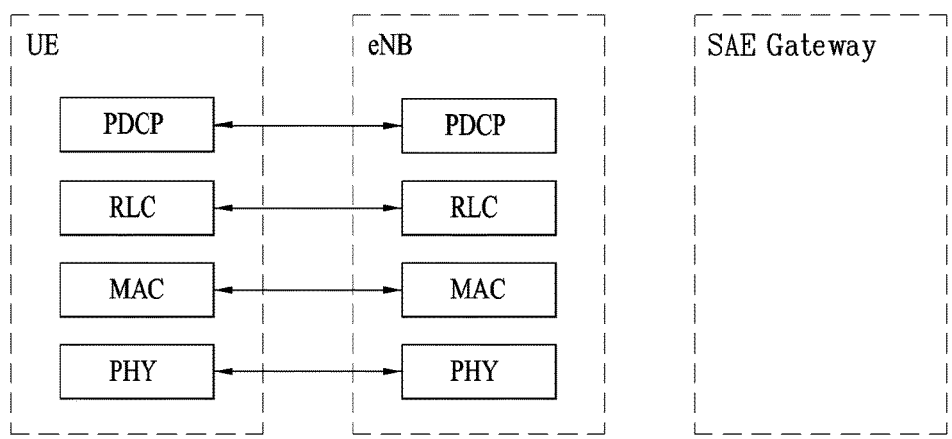
(b) user-plane protocol stack FIG. 11
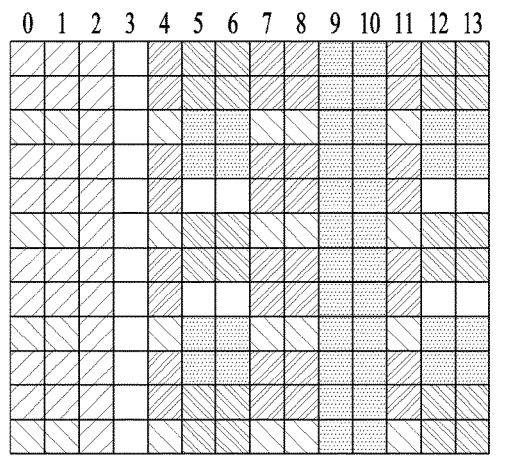 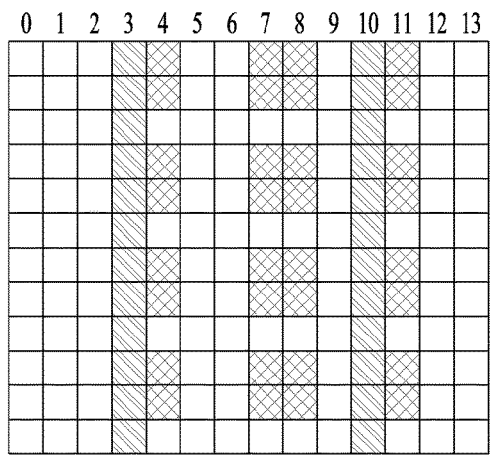
(a) DL resource grid   (b) UL resource grid
FIG. 12
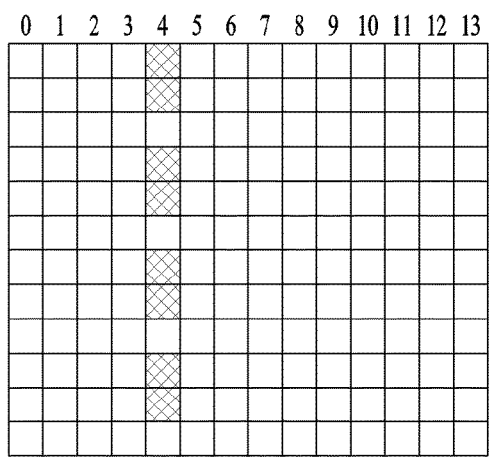
Antenna port 0

FIG. 13
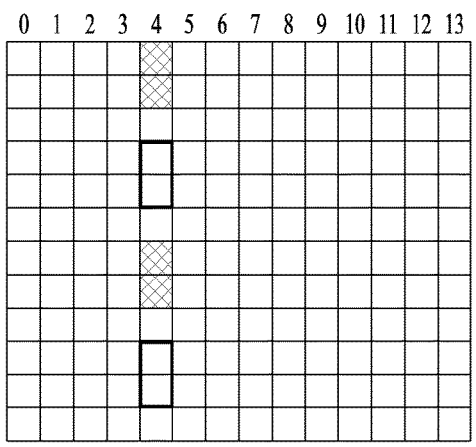
Antenna port 0
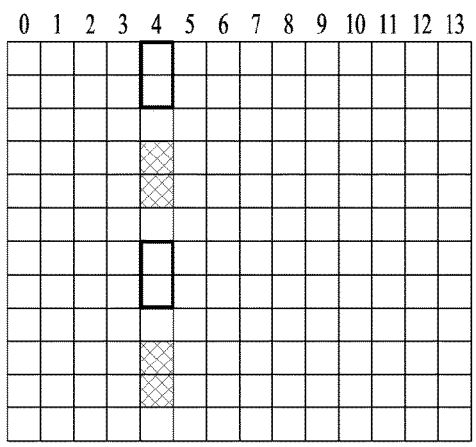
Antenna port 1

FIG. 14
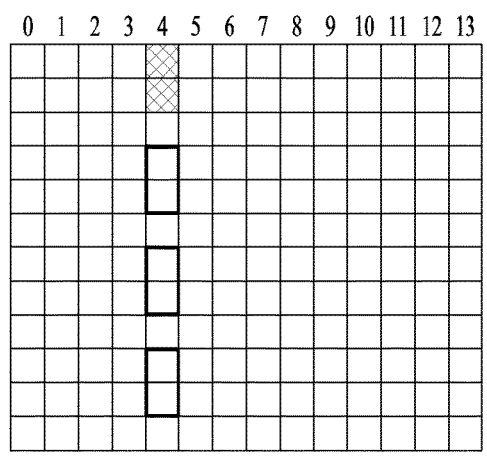
Antenna port 0
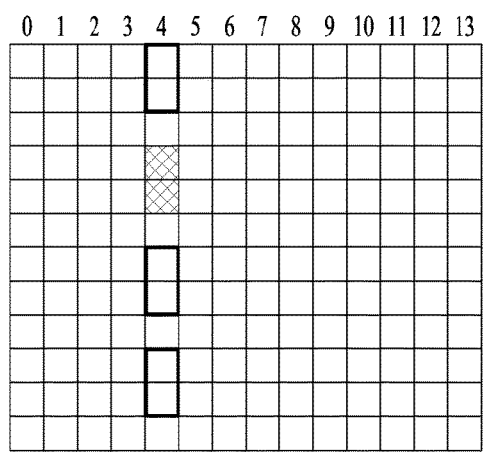
Antenna port 1
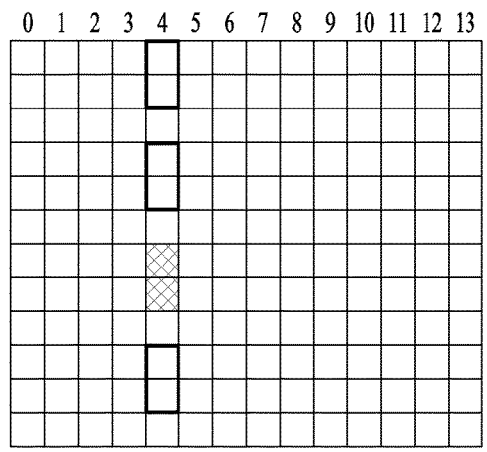
Antenna port 2
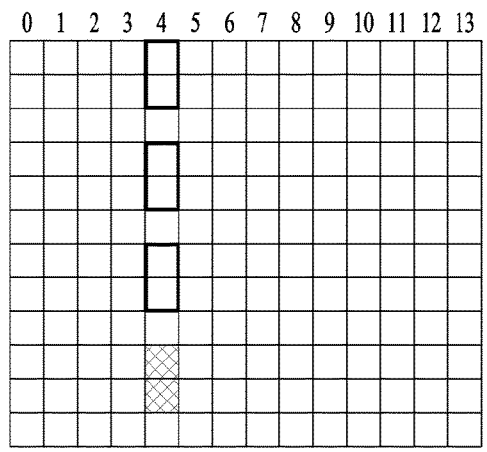
Antenna port 3

FIG. 15
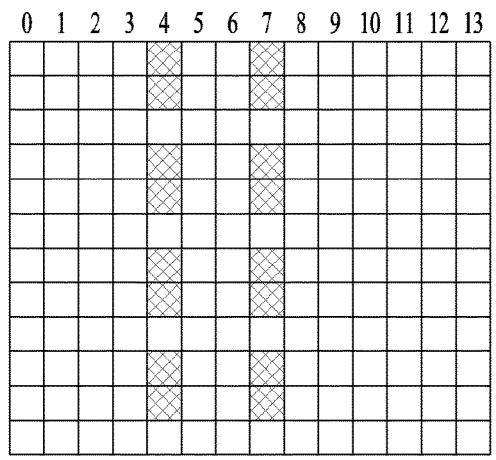
Antenna port 0
FIG. 16
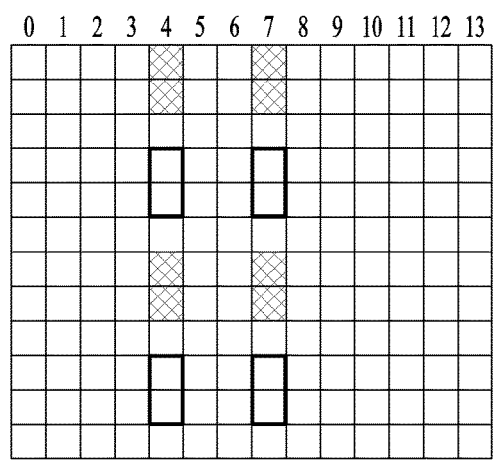 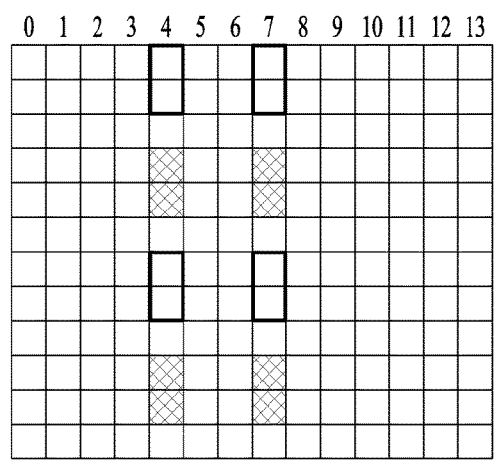
Antenna port 0                    Antenna port 1

FIG. 17
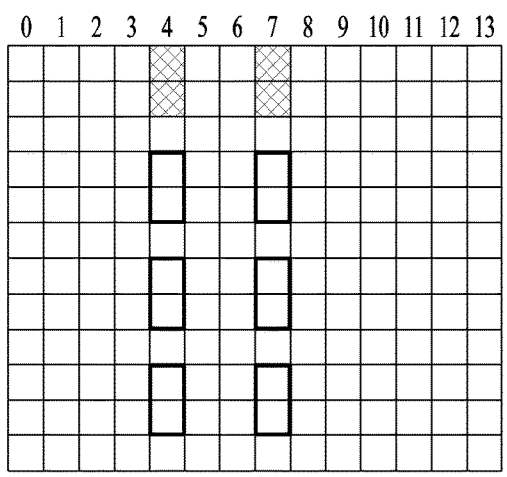
Antenna port 0
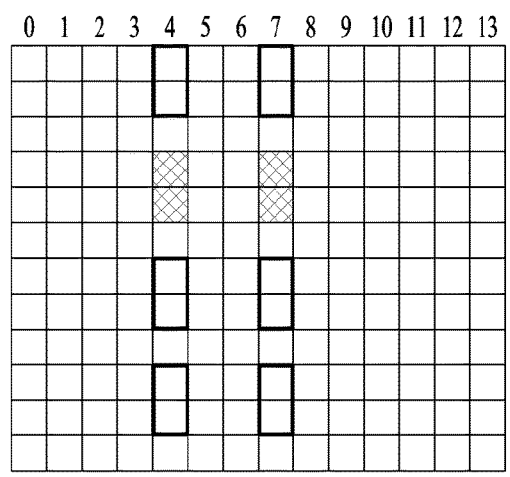
Antenna port 1
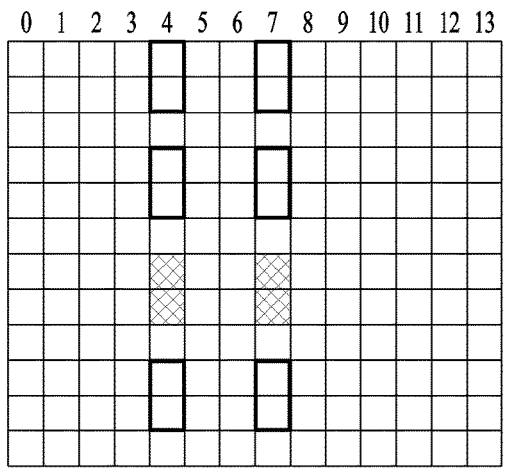
Antenna port 2
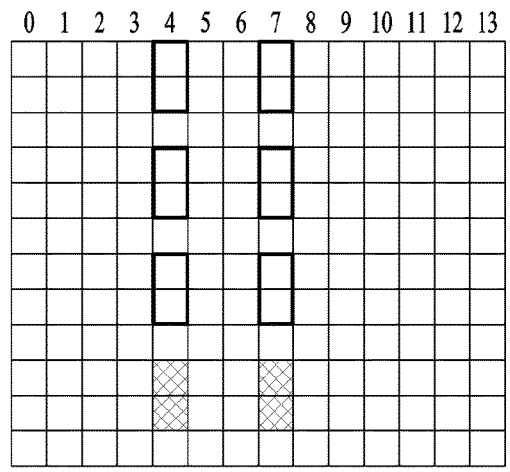
Antenna port 3

METHOD FOR ORDERING MEASURING OF INTER-DEVICE INTERFERENCE IN WIRELESS COMMUNICATION SYSTEM, AND DEVICE FOR SAME

CROSS REFERENCE TO RELATED APPLICATIONS

This application is the National Phase of PCT International Application No. PCT/KR2015/011982, filed on Nov. 9, 2015, which claims priority under 35 U.S.C. 119(e) to U.S. Provisional Application No. 62/077,298, filed on Nov. 9, 2014, all of which are hereby expressly incorporated by reference into the present application.

TECHNICAL FIELD

The present invention relates to a wireless communication system, and more particularly, to a method of instructing to measure inter-device interference (IDI) in a wireless communication system and device for the same.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the above discussion, a method of instructing to measure inter-device interference (IDI) in a wireless communication system and device for the same are proposed.

The technical problems solved by the present invention are not limited to the above technical problems and those skilled in the art may understand other technical problems from the following description.

Technical Solutions

In an aspect of the present invention, provided is a method of instructing to measure inter-device interference (IDI) in a wireless communication system, the method performed by an evolved node B (eNB) and including: transmitting downlink allocation information on specific radio resources to a first user equipment (UE); instructing the first UE to measure the IDI when the specific radio resources are allocated to one or more second UEs for uplink communication; instructing the one or more second UEs to transmit reference signals defined for IDI measurement; and transmitting, to the first UE, reference signal measurement information allocated to the one or more second UEs.

Preferably, the reference signal measurement information may indicate locations for measuring the reference signals through uplink control information.

Preferably, when the number of the one or more second UEs is equal to or greater than a predetermined number, instructing to transmit the reference signals may include instructing the predetermined number of second UEs among the one or more second UEs to transmit reference signals.

Preferably, instructing to transmit the reference signals may include instructing a second UE with largest spacing between uplink subframes among the one or more second UEs to transmit a reference signal.

Preferably, the method may include configuring a timer for each of the one or more second UEs. In this case, the timer may be configured to be reset when the eNB instructs to transmit the reference signals.

Preferably, the reference signal measurement information may be configured such that each of the one or more second UEs can identify its own reference signal measurement information.

Preferably, order of the reference signals of the one or more second UEs may be determined in advance and locations for transmitting the reference signals may be determined by configuration bits of the reference signal measurement information.

Preferably, the method may further include receiving, from the first UE, an IDI measurement result measured on the specific radio resources based on the reference signals.

In another aspect of the present invention, provided is an evolved node B (eNB) for instructing to measure inter-device interference (IDI) in a wireless communication system, including a radio frequency unit and a processor. In this case, the processor may be configured to: transmit downlink allocation information on specific radio resources to a first user equipment (UE); instruct the first UE to measure the IDI when the specific radio resources are allocated to one or more second UEs for uplink communication; instruct the one or more second UEs to transmit reference signals defined for IDI measurement; and transmit, to the first UE, reference signal measurement information allocated to the one or more second UEs.

Advantageous Effects

According to embodiments of the present invention, it is possible to efficiently measure a location of a UE in a full-duplex wireless communication system.

Effects obtainable from the present invention are non-limited by the above-mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a diagram showing a control plane and a user plane of a radio interface protocol between a UE and an E-UTRAN based on a 3rd generation partnership project (3GPP) radio access network standard.

FIG. 11 illustrates DL/UL resource grids related to an IDI measurement signal.

FIGS. 12 to 17 are reference diagrams illustrating a relationship between IDICSI-RS patterns for a UE and the number of transmit antenna ports.

BEST MODE FOR INVENTION

Figure 1:
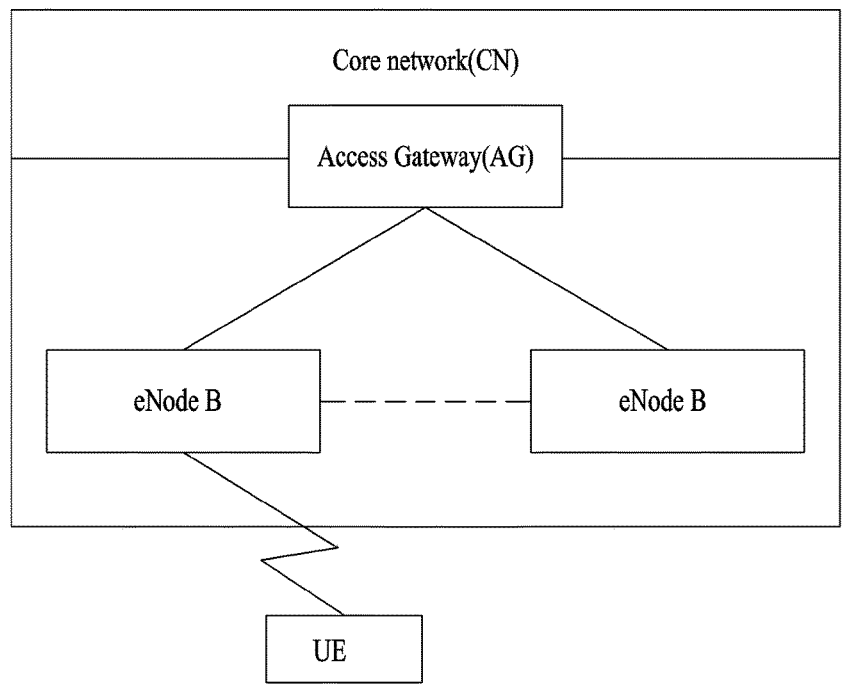
FIG. 1 is a diagram showing a network structure of an Evolved Universal Mobile Telecommunications System (E-UMTS) as an example of a wireless communication system.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Additionally, the specific terms used in the following description of the present invention are provided to facilitate the understanding of the present invention. And, therefore, without deviating from the technical scope and spirit of the present invention, such specific terms may also be varied and/or replaced by other terms.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane.

The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
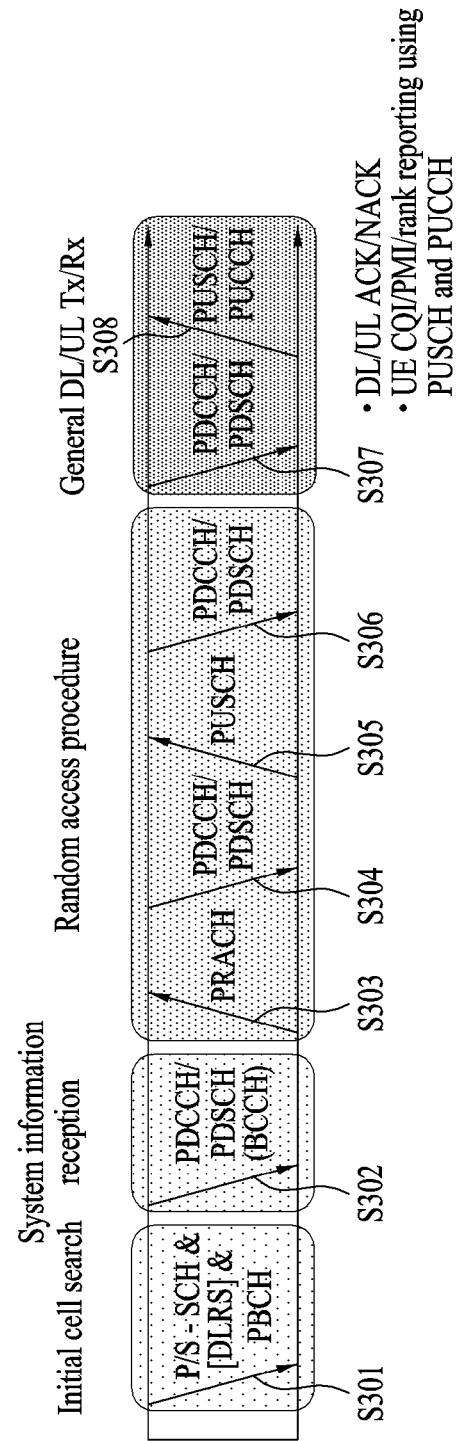
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303) and receive a response message of the preamble through the PDCCH and the PDSCH corresponding thereto (S304). In the contention-based RACH a contention resolution procedure, such as a transmission of the PRACH (S305) and a reception of the PDCCH and the PDSCH corresponding thereto (S306), may be additionally performed.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 4:
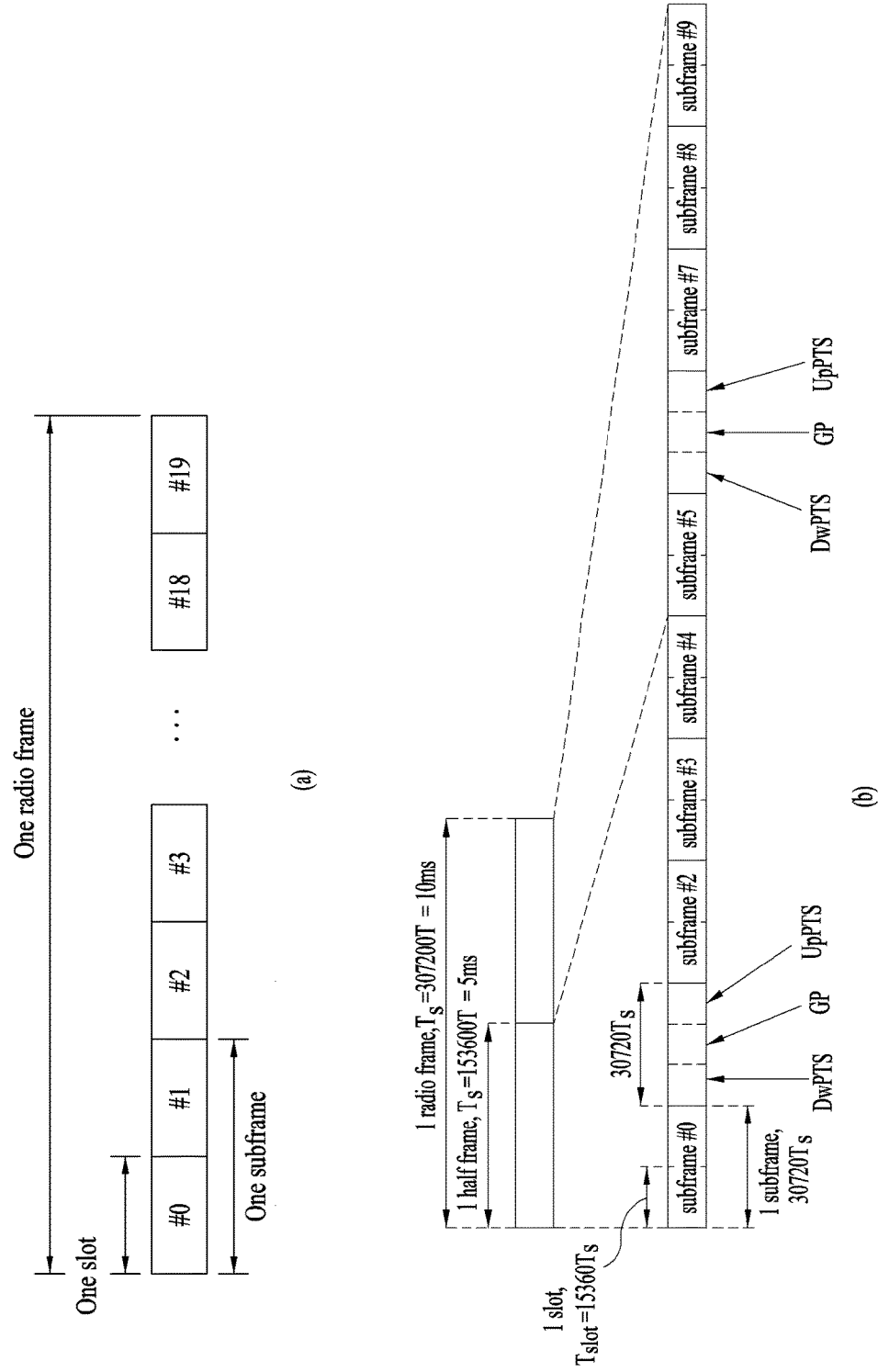
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 4(b) illustrates the type-2 radio frame structure. The type-2 radio frame includes two half frames each having 4 normal subframes, a downlink pilot time slot (DwPTS), a guard period (GP), and an uplink pilot time slot (UpPTS). Each normal subframe includes two slots.

In the special subframe, the DwPTS is used for initial cell search, synchronization, or channel estimation in a UE, whereas the UpPTS is used for channel estimation in an eNB and uplink transmission synchronization in a UE. That is, the DwPTS is used for a downlink transmission, the UpPTS is used for uplink transmission, and, specifically, the UpPTS is used for a transmission of the PRACH preamble or a SRS. The GP is a period between a downlink and an uplink, for eliminating interference with the uplink caused by multipath delay of a downlink signal.

In the current 3GPP standard document, the configuration of a special subframe is defined as shown below in Table 1. In Table 1, when $T_s=1/(15000 \times 2048)$, this indicates DwPTS and UpPTS, and the remaining area is set up as the guard period.

The above-described structure of the radio frame is merely exemplary. And, therefore, the number of subframes included in the radio frame or the number of slots included in a subframe, and the number of symbols included in one slot may be diversely varied.

Figure 5:
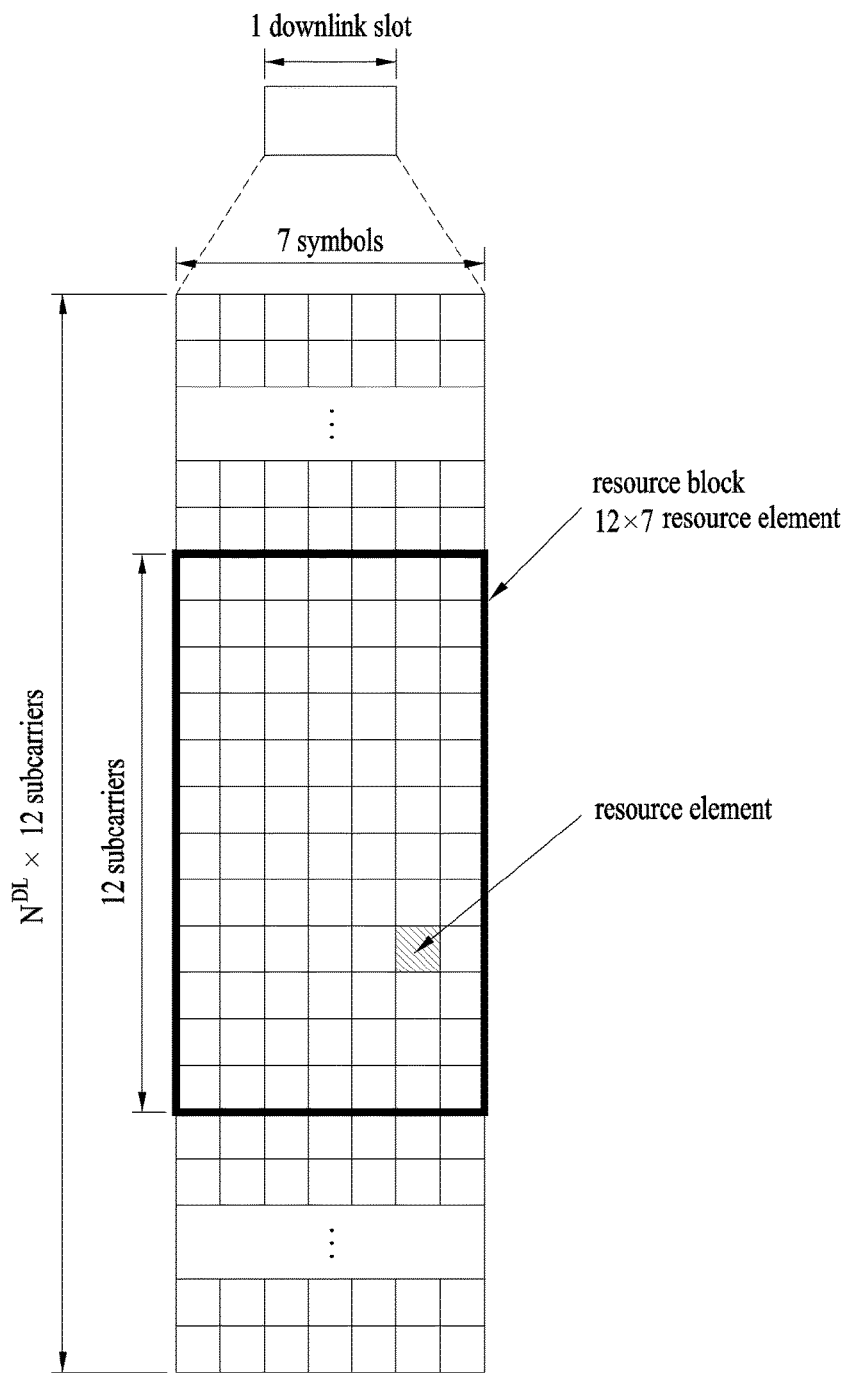
FIG. 5 is a diagram showing a resource grid for a downlink slot.

FIG. 5 illustrates a resource grid for a downlink slot.

Referring to FIG. 5, a downlink slot includes $N_{symb}^{DL}$ OFDM symbols in a time domain and $N_{RB}^{DL}$ resource blocks in a frequency domain. Since each resource block includes $N_{SC}^{RB}$ subcarriers, the downlink slot includes $N_{RB}^{DL} \times N_{SC}^{RB}$ subcarriers in the frequency domain. Although FIG. 5 illustrates that the downlink slot includes 7 OFDM symbols and the resource block includes 12 subcarriers, it is to be understood that the present invention is not limited thereto. For example, the number of OFDM symbols included in the downlink slot may be changed depending on a length of CP (cyclic prefix).

Each element on a resource grid is referred to as a resource element (RE). One resource element is indicated by one OFDM symbol index and one subcarrier index. One RB includes $N_{symb}^{DL} \times N_{SC}^{RB}$ resource elements. The number $N_{RB}^{DL}$ of resource blocks included in the downlink slot depends on a downlink transmission bandwidth configured in a cell.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, in a Type 2 radio frame structure, more specifically, in a TDD system, an uplink/downlink subframe configuration (UL/DL configuration) is as shown below in Table 2.

Figure 6:
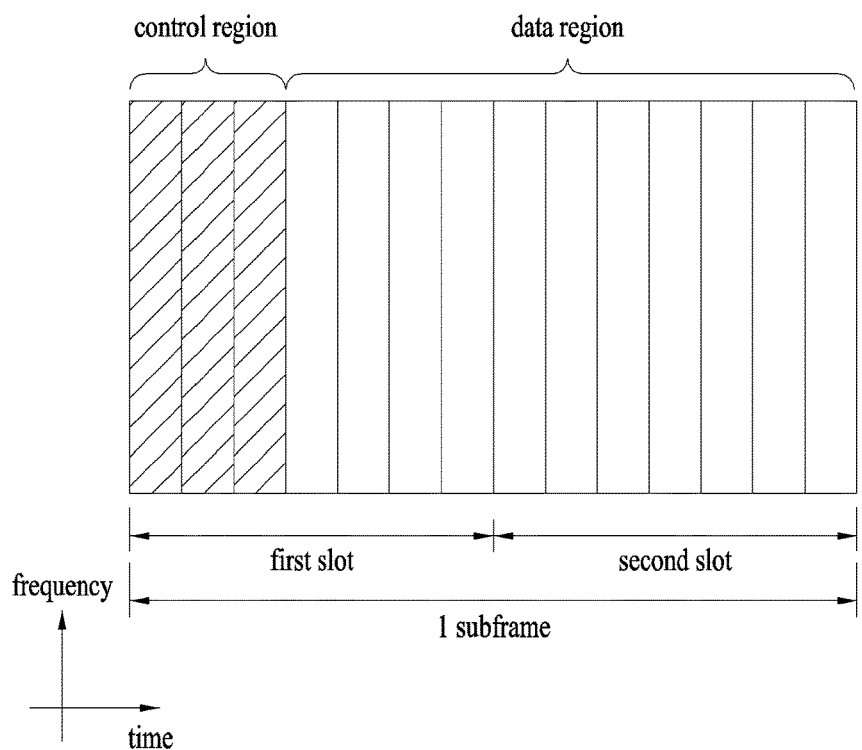
FIG. 6 illustrates an example of a downlink subframe structure.

FIG. 6 illustrates a downlink subframe structure.

Referring to FIG. 6, up to three (or four) OFDM symbols at the start of the first slot in a downlink subframe are used for a control region to which control channels are allocated

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe, and S represents the special subframe. Additionally, in Table 2, downlink-uplink switching periodicity in the uplink/downlink subframe configuration of each system.

and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH).

The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information and other control information for an UE or an UE group. For example, the DCI includes downlink/uplink scheduling information, an uplink transmit (Tx) power control command, and etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, Tx power control command, activity indication information of voice over Internet protocol (VoIP), and the like. A plurality of PDCCHs can be transmitted in the control region. The UE is able to monitor a plurality of the PDCCHs. The PDCCH is transmitted on aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 7:
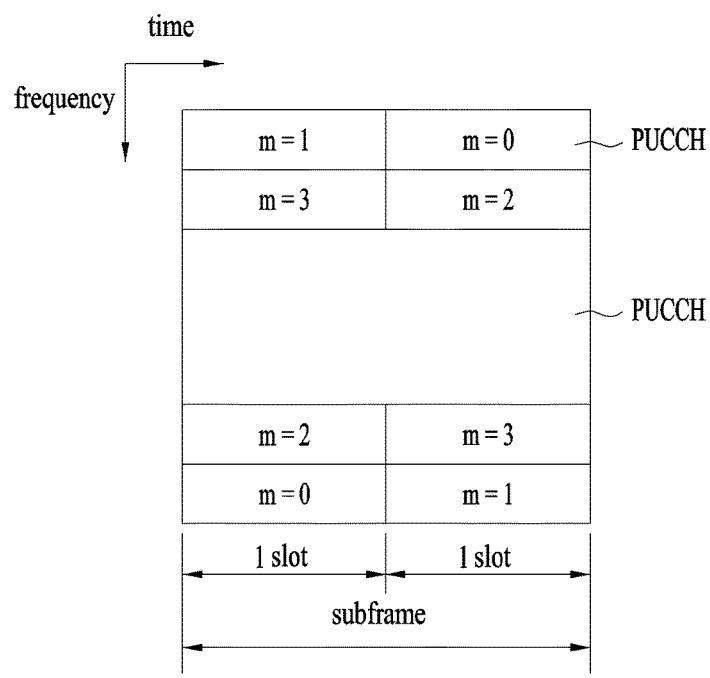
FIG. 7 is a diagram showing a structure of an uplink subframe used in LTE.

FIG. 7 illustrates a structure of an uplink subframe used in LTE.

Referring to FIG. 7, an uplink subframe includes a plurality (e.g., 2) of slots. The number of SC-FDMA symbols included in the slot may vary depending on the CP length. The uplink subframe is divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.

SR (scheduling request): Information used to request UL-SCH resources. This is transmitted using an on-off keying (OOK) scheme.

HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.

CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

Figure 8:
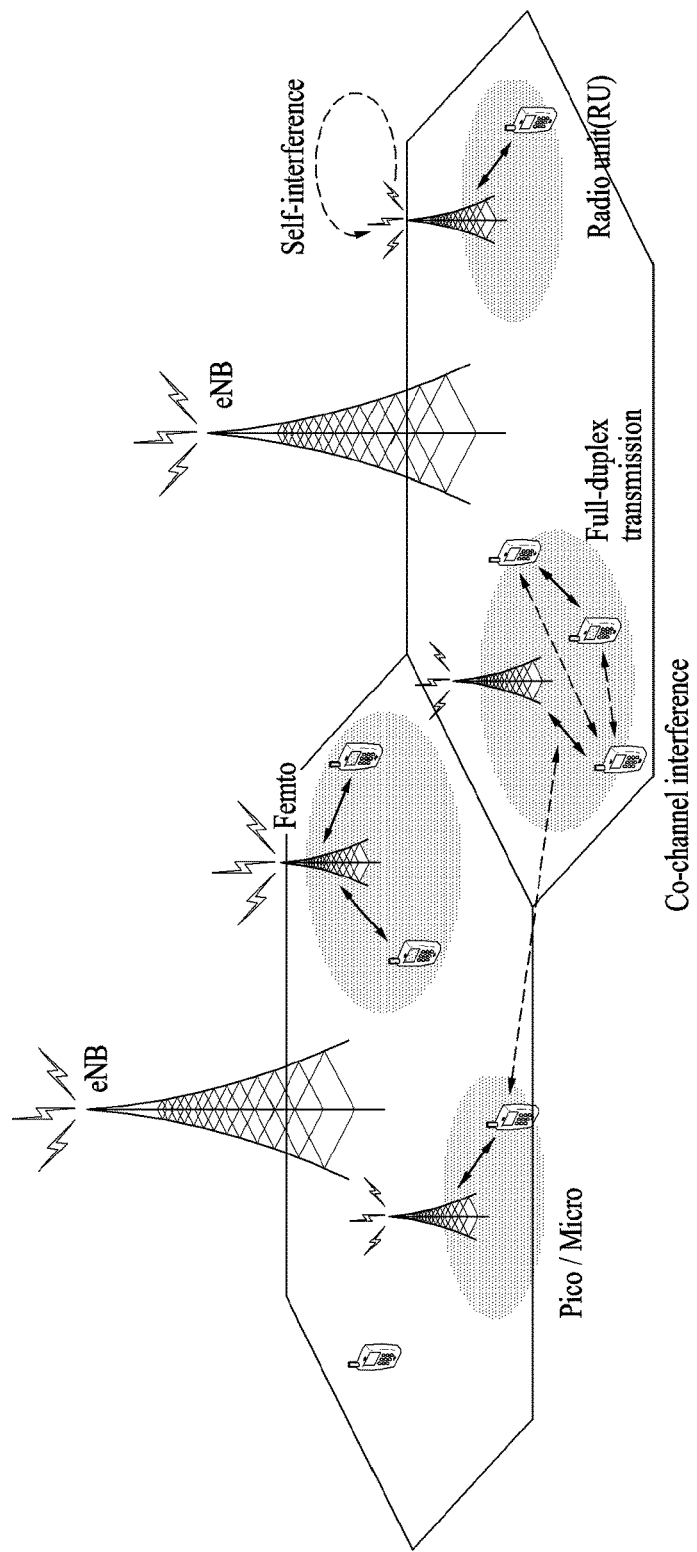
FIG. 8 is a conceptual diagram illustrating a full duplex radio (FDR) communication system.

FIG. 8 is a conceptual diagram illustrating a full duplex radio (FDR) communication system. Referring to FIG. 8, the FDR may refer to a system for simultaneously performing transmission/reception (Tx/Rx) using the same resources by a transmission device (e.g., a UE and a BS). In this case, the same resources may refer to radio resources having the same time and the same frequency. As shown in FIG. 8, a UE and a BS for supporting FDR may be present. In this case, interference may be largely classified into intra-device interference and inter-device interference according to FDR support. The intra-device interference may refer to the case in which an output signal of a transmission (Tx) antenna is received by a reception (Tx) antenna within one BS or one UE such that interference occurs. The inter-device interference may refer to the case in which an uplink (UL) signal transmitted from BS, UE, or the like is received by the BS or UE such that interference occurs.

The following description will be given centering on inter-device interference (hereinafter referred to as IDI) for convenience of description.

Figure 9:
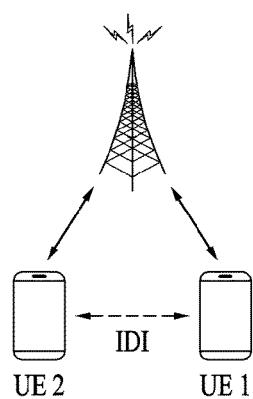
FIG. 9 is a conceptual diagram illustrating inter-device interference (IDI).

FIG. 9 is a conceptual diagram illustrating inter-device interference (IDI). Referring to FIG. 9, IDI may refer to interference generated in FDR because the same radio resources are used in one cell. FIG. 9 is a conceptual diagram illustrating IDI generated when a base station (BS) uses a full duplex (FD) mode (i.e., a simultaneous Tx/Rx mode using the same frequency) within the same resources. Although FIG. 9 illustrates only 2 UEs for convenience of IDI description, the concept of FIG. 9 may also be applied to the case in which two or more UEs are present.

Since a conventional communication system transmits and receives signals using Frequency Division Duplex (FDD) or Time Division Duplex (TDD), i.e., since the conventional communication system transmits and receives signals using Tx/Rx resources, no IDI occurs. In addition, interference of contiguous cells in the conventional communication system is still valid even in the FDR system, and as such a detailed description thereof will herein be omitted for convenience of description.

Figure 10:
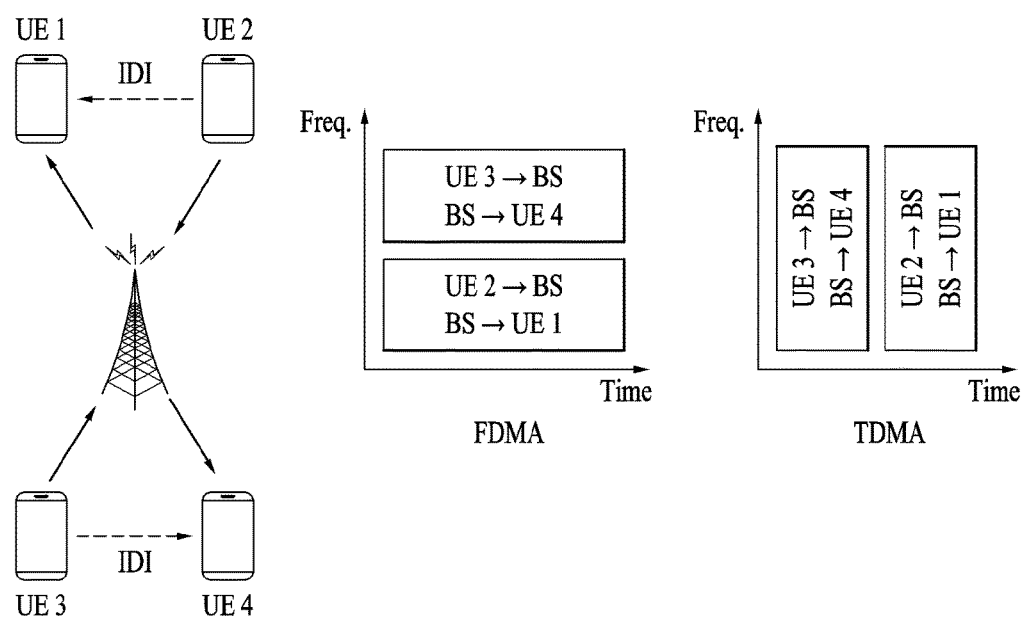
FIG. 10 is a conceptual diagram illustrating multiple access of a user equipment (UE) in a FDR system.

FIG. 10 is a conceptual diagram illustrating multiple access of a UE in the FDR system. Referring to FIG. 10, not only the full duplex scheme using the same resources, but also the other full duplex scheme not using the same resources may be present. FIG. 10 illustrates examples of FDMA and TDMA when a base station (BS) operates in the full duplex (FD) mode in the same resources and several UEs perform multiple access.

In the TDD system using full duplex communication within the same resources, it is assumed that frame configuration for measuring interference between asynchronous devices, transmission of a signal for identifying each device, and listening attempt configuration are performed. Under this assumption, data can be simultaneously transmitted or received within the cell through UE-specific configuration indicating a method for allocating different configurations to the respective UEs within each cell.

That is, after completion of IDI between devices, in order to reduce or remove the measured IDI, a unique signature may be assigned to each UE or each UE group. In this case, a signal for measuring interference capable of being discriminated between UEs will hereinafter be referred to as a signature signal.

Therefore, through the received signature signal, the UE may recognize signal strength of a UE causing IDI, a UE or signature index, a channel vector such as a phase, timing information, etc. Further, the signature signal may identify a UE or a UE group. For example, the signal may be any of a code sequence, a puncturing pattern, etc. That is, a unique scramble or interleaving of a UE or a UE group may be applied using the code sequence. In order to facilitate interference measurement by the Rx UE, the signature signal may also be exclusively transmitted from one UE or one UE group. In this case, an exclusive unit may be a minimum OFDM symbol.

For instance, assuming that the signature signal is configured with a sequence and it is transmitted through one OFDM symbol, an index of a sequence to be transmitted by each UE can be determined based on a UE ID. That is, it can be expressed as a function of the UE ID (i.e., function (UE_ID)). Alternatively, the amount of information contained in the UE ID is larger than that included in the sequence index, the index can be calculated by a mod operation (e.g., Sequence Index=(UE ID) mod (Total index number)).

Thus, as an embodiment of the present invention, an m-sequence can be established by reflecting the UE ID or the sequence index in order to distinguish between signature signals. Assuming that a secondary synchronization signal of the LTE system is used, the m-sequence can be defined as shown in Equation 1.

Equation 1

$$m_0 = m' \bmod 31$$
$$m_1 = (m_0 + \lfloor m'/31 \rfloor + 1) \bmod 31$$
$$m' = N_{ID}^{(1)} + q(q-1)/2,$$
$$q = \left\lfloor \frac{N_{ID}^{(1)} + q'(q'+1)/2}{30} \right\rfloor, q' = \lfloor N_{ID}^{(1)}/30 \rfloor$$

[Equation 1]

According to Equation 1, $N^{(1)}$ can be calculated using the UE_ID or the sequence index and thus m' can also calculated. Therefore, it is possible to distinguish between signature signals.

In addition, the present invention can be applied when UE group classification (grouping) is performed to schedule UEs that cause IDI in the FDR system or when strength of an IDI signal for grouping is measured and reported. Moreover, the present invention can be applied when resource for IDI channel measurement are configured. Furthermore, when a configured group is updated either periodically or aperiodically, the present invention can be applied to eNB/UE's operation of measuring and reporting strength of an IDI signal with low complexity.

FIG. 11 illustrates DL/UL resource grids related to an IDI measurement signal. For convenience of description, each resource grid is simplified and shows resources in a single RB. (The number of allocated REs may be changed depending on the number of antenna ports. However, according to the present invention, the number of REs can be determined based on allocated functionality, for example, in consideration of the maximum number of positions where CRSs and REs can be placed.)

Specifically, FIG. 11(a) shows a DL resource grid and FIG. 11(b) shows a UL resource gird.

In this case, a single symbol may be allocated for an IDICSI-RS in each UE and a total of eight resource elements (REs) may be used for transmission of a single resource block (RB). That is, if n RBs are used, a total of (8×n) REs may be used. In addition, the conventional scheme used for generating a DM-RS signal based on the Zadoff-Chu CAZAC may also applied. Moreover, if there are more than five UEs which need to be measured simultaneously, a cyclic shift value may be changed or CDM may be used to distinguish between UEs (e.g., OCC length 2 may be used when there are five to eight UEs).

Depending on the number of transmit antennas of an eNB, it is possible to transmit IDICSI-RSs maximum four antenna ports. For example, if the eNB has two transmit antennas, IDICSI-RSs for antenna ports 0 and 1 are transmitted. If the eNB has four transmit antennas, IDICSI-RSs for antenna ports 0 to 3 are transmitted.

FIGS. 12 to 14 are reference diagrams for explaining an IDICSI-RS pattern for a UE, which uses a fourth time symbol corresponding to a general 1RB when transmit antenna ports are 1, 2, and 4. That is, in FIG. 12, since one antenna port is used, an IDICSI-RS for antenna port 0 may be transmitted in the entirety of the fourth time symbol. However, in FIGS. 13 and 14, since a plurality of antenna ports are used, IDICSI-RS transmission may be configured such that IDICSI-RSs for individual antenna ports do not overlap with each other.

FIGS. 15 to 17 are reference diagrams for explaining IDICSI-RS patterns for two UEs, which respectively use a fourth time symbol and a seventh time symbol, each of which corresponding to a general 1RB, when transmit antenna ports are 1, 2, and 4. The pattern used for the single UE can be equally applied to FIGS. 15 to 17. However, common frequency bands allocated for both of the two UEs on time symbols having the same OFDM symbol index may be set equal to each other with respect to the same antenna port.

Based on the above discussion, a method for an eNB to instruct how to measure an IDI channel in UL/DL subframe will be described in the present invention. According to the method, it is possible to efficiently support the resource arrangement for channel measurement illustrated in FIG. 11.

As described above, in the FDR system, a UE may operate in half-duplex (HD) mode so that the UE can transmit either a UL signal or a DL signal in a time slot. In addition, a UE may operate in full-duplex (FD) mode so that the UE can simultaneously transmit UL and DL signals.

For convenience of description, a UE that causes IDI is referred to as an aggressor and a UE that suffers from the IDI is referred to as a victim. In addition, it is assumed that the IDI is measured by the victim.

Figure 18:
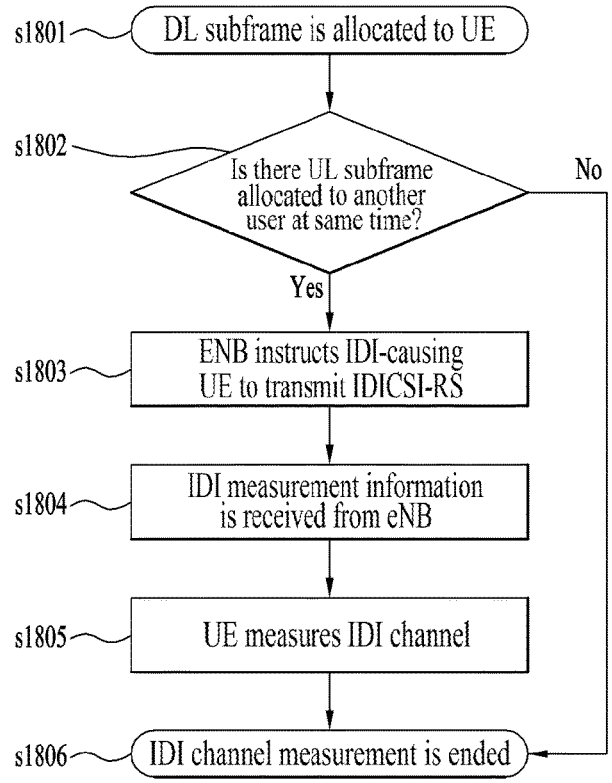
FIG. 18 is a reference diagram for explaining a method of measuring IDI in a DL subframe according to an embodiment of the present invention.

FIG. 18 is a reference diagram for explaining a method of measuring IDI in a DL subframe according to an embodiment of the present invention. A method of instructing a UE operating in HD mode to measure an IDI channel will be described with reference to FIG. 18. Considering that damage due to IDI is caused by reception of the IDI, the damage may occur when a DL subframe is allocated to a UE. IDI measurement is performed on a DL subframe for receiving a signal [s1801].

If a UL subframe allocated to another UE that uses the same radio resource (frequency/time) and the DL subframe where the IDI measurement is performed exist at the same time, IDI may occur. Thus, i) when there is a UL subframe allocated for another UE that uses the same radio resource at an IDI measurement time or ii) when there is a UL subframe allocated for a UE capable of transmitting a signal for measuring an IDI channel, an eNB may instruct to measure IDI [s1802].

The eNB instructs aggressors to transmit reference signals (RSs) for IDI measurement, IDICSI-RSs [s1803]. In this case, the eNB may inform each of the aggressors of an RS transmission location (e.g., a location of a resource element in a resource grid) through UL control information (e.g., UL grant).

For example, it is assumed that a total of N aggressors (where N is a positive integer) are present in the UL resource grid shown in FIG. 11 and a DL subframe is allocated for an IDI-measuring UE. If UL subframes are simultaneously allocated for more than M users (where M is a positive integer and M>N), the eNB may instruct N users to measure IDI by selecting the N users from among the M users and then instruct the remaining users (M−N) to transmit RSs in UL subframes. Alternatively, the eNB may configure a timer for each aggressor. For example, after resetting a timer for a UE that receives an instruction to transmit the IDICSI-RS, the eNB may not transmit any more instruction to transmit the IDICSI-RS during a prescribed time (e.g., until expiration of the timer). In addition, if timers for N users or more are expired at the same time, the eNB may select the N users in ascending order of time. Moreover, since the eNB can be aware of spacing between UL subframes of each aggressor, the eNB may instruct an aggressor with the largest spacing to transmit the RS.

The eNB may transmit information on an RE with zero power to a victim to measure the IDI [s1804].

For example, the eNB may designate and indicate a fixed IDICSI-RS transmission location for each user in the step s1803 and then inform the victim (i.e., IDI-measuring UE) of a fixed ZP-IDICSI-RS transmission location in the step s1804.

In the case of a single aggressor, the eNB needs to transmit a total of $\log_2(N+1)$ bits to the IDI-measuring UE. However, if IDI is caused by more than two aggressors, the eNB needs to transmit a combination index of candidate UEs to the IDI-measuring UE. That is, a total of $$\log_2\left(\sum_{k=1}^{N} {}_N C_k + 1\right)$$

bits are required. In this case, a flag bit indicating not to transmit the RS may be included in the bits. For instance, if N is equal to 3, '00' may indicate prohibition/drop of RS transmission, '01' may indicate that RS transmission is performed at a first location, '10' may indicate that RS transmission is performed at a second location, and '11' may indicate that RS transmission is performed at a third location.

Further, a scheme of informing a minimum bit for instructing measurement according to the present invention will be described in detail.

When a plurality of users (e.g., M users) simultaneously transmit IDICSI-RSs, the eNB may enable the IDI-measuring UE to sequentially receive M IDICSI-RSs. In this case, the order of N IDICSI-RSs (and N ZP-IDICSI-RS) may be predetermined and it can be shared between the eNB and all UEs in the FDR system.

Thus, the eNB informs each aggressor of the IDICSI-RS transmission location using $\log_2(N+1)$ bits through UL control information (e.g., UL grant). In addition, the eNB transmits $\log_2(N+1)$ bits to victims through DL control information (e.g., DL grant) to inform how many RSs are transmitted until now. In this case, the flag bit indicating not to transmit the RS may be included in the bits. For instance, if N is equal to 3, '00' may indicate prohibition/drop of RS transmission, '01' may indicate that RS transmission is performed at a first location, and '10' may indicate that RS transmission is performed at a second location, i.e., two users transmit RSs.

In step s1805, the UE measures the IDI channel and then feedback the corresponding channel information. In this case, the UE can perform feedback in the order of the RS locations by transmitting and receiving the information on the RS with zero power for the IDI measurement mentioned in the step s1804. In addition, since the eNB is aware of the order of the UE's RS locations, the eNB may sequentially receive the corresponding information and then map the received information to individual channels.

Further, according to the present invention, the method of instructing to measure the IDI channel can be applied when a UE operates in the FD mode.

That is, since a UE operates in the FD mode, UL communication and DL communication can be simultaneously performed. If there is DL data, the UE may operate as shown in FIG. 18. In addition, if there is no DL data or if only the UL communication is performed due to self-interference cancellation, an eNB may instruct an IDI-measuring UE to perform IDI measurement as shown in FIG. 18 through a UL subframe.

Figure 19:
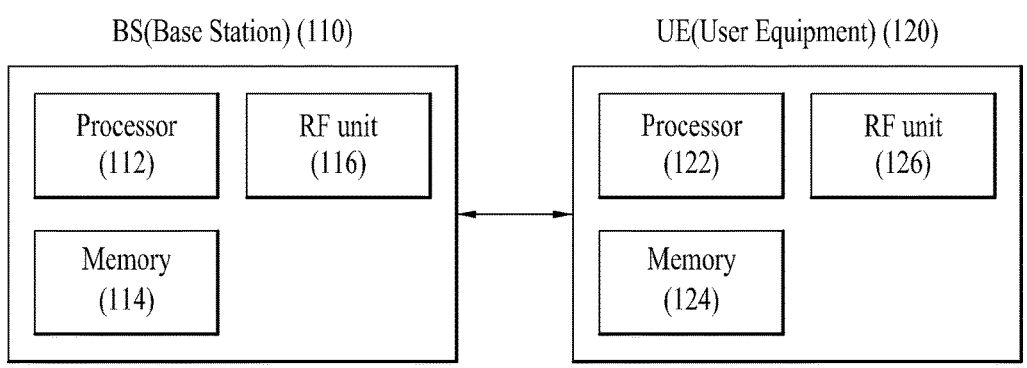
FIG. 19 is a block diagram illustrating a base station (BS) and a user equipment (UE) according to an embodiment of the present invention.

FIG. 19 is a diagram of a base station and a user equipment applicable to one embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 19, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit is provided within or outside the processor to exchange data with the processor through the various means known in public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of instructing to measure inter-device interference (IDI) in a wireless communication system and device for the same are mainly described with reference to examples applied to the 3GPP LTE system, the method and device can be applied to various kinds of wireless communication systems as well as the 3GPP LTE system.

What is claimed is:

1. A method of supporting measurement of inter-device interference (IDI) by a base station (BS) in a wireless communication system, the method comprising:
    transmitting, to a first user equipment (UE), downlink allocation information on specific radio resources being allocated to the first UE for downlink communication;
    in a case that the specific radio resources are allocated to at least one second UE for uplink communication:
        transmitting, to a number N of the at least one second UE, information on transmitting reference signals in reference signal transmission resources, where N is a natural number;
        transmitting, to the first UE, reference signal measurement information on the reference signal transmission resources for measuring the IDI; and
        receiving, from the first UE, channel information comprising the measured IDI on the reference signal transmission resources based on the reference signals transmitted from the number N of the at least one second UE,
    wherein the number N of the at least one second UE is selected from among the at least one second UE based on at least one of:
        an interval between uplink subframes configured for the at least one second UE, respectively, or
        using a timer for a respective one of the at least one second UE, wherein the timer for the respective one of the at least one UE is configured to be reset, in a case that the respective one of the at least one second UE is informed to transmit the reference signals.

2. The method of claim 1, wherein the reference signal measurement information is transmitted through uplink control information.

3. The method of claim 1, wherein, in a case that the number of the at least one UE is equal to or greater than a predetermined number, the number N is configured as the predetermined number.

4. The method of claim 1, wherein the reference signal measurement information is configured such that the first UE can identify the reference signal measurement information for the respective number N of the at least one second UE, respectively.

5. The method of claim 1, wherein order of the reference signals of the number N of the at least one second UE is predetermined respectively, and
    wherein the reference signal transmission resources in which the reference signals are transmitted are determined by configuration bits of the reference signal measurement information.

6. A base station (BS) for supporting measurement of inter-device interference (IDI) in a wireless communication system, the BS comprising:
    a transceiver; and
    at least one processor coupled with the transceiver and configured to:
        control the transceiver to transmit, to a first user equipment (UE), downlink allocation information on specific radio resources being allocated to the first UE for downlink communication;
        in a case that the specific radio resources are allocated to at least one second UE for uplink communication:

control the transceiver to transmit, to a number N of the at least one second UE, information on transmitting reference signals in reference signal transmission resources, where N is a natural number; and control the transceiver to transmit, to the first UE, reference signal measurement information on the reference signal transmission resources for measuring the IDI; and control the transceiver to receive, from the first UE, channel information comprising the measured IDI on the reference signal transmission resources based on the reference signals transmitted from the number N of the at least one second UE, wherein the number N of the at least one second UE is selected from among the at least one second UE based on at least one of:

an interval between uplink subframes configured for the at least one second UE, respectively, or using a timer for a respective one of the at least one second UE, wherein the timer for the respective one of the at least one UE is configured to be reset, in a case that the respective one of the at least one second UE is informed to transmit the reference signals.

* * * * *